United States Patent
Wilkins

(10) Patent No.: US 9,499,341 B2
(45) Date of Patent: Nov. 22, 2016

(54) TRANSMISSION HAVING VARIABLE OUTPUT ORIENTATION

(71) Applicant: Intelligrated Headquarters LLC, Mason, OH (US)

(72) Inventor: John Joseph Wilkins, Erlanger, KY (US)

( * ) Notice: Subject to any disclaimer, the term of this patent is extended or adjusted under 35 U.S.C. 154(b) by 14 days.

(21) Appl. No.: 14/063,400

(22) Filed: Oct. 25, 2013

(65) Prior Publication Data

US 2014/0116841 A1 May 1, 2014

Related U.S. Application Data

(60) Provisional application No. 61/718,564, filed on Oct. 25, 2012.

(51) Int. Cl.
| | |
|---|---|
| *B65G 17/32* | (2006.01) |
| *B65G 47/46* | (2006.01) |
| *B65G 13/06* | (2006.01) |
| *B65G 39/02* | (2006.01) |
| *B65G 47/54* | (2006.01) |
| *B65G 47/71* | (2006.01) |

(52) U.S. Cl.
CPC ........... *B65G 13/065* (2013.01); *B65G 39/025* (2013.01); *B65G 47/54* (2013.01); *B65G 47/71* (2013.01)

(58) Field of Classification Search
CPC ...... B65G 47/54; B65G 47/71; B65G 17/24; B65G 13/06; B65G 13/071; B65G 13/073
USPC ......................................... 198/370.09, 371.3
See application file for complete search history.

(56) References Cited

U.S. PATENT DOCUMENTS

| | | |
|---|---|---|
| 3,334,723 A | 8/1967 | Reed, et al. |
| 3,356,236 A | 12/1967 | Shaw, et al. |
| 3,645,379 A | 2/1972 | Kornylak |
| 3,679,043 A | 7/1972 | Becker |
| 3,710,917 A | 1/1973 | Black et al. |
| 3,804,230 A | 4/1974 | Krivec |
| 3,961,694 A | 6/1976 | Murakami |
| 4,008,798 A | 2/1977 | Krivec |
| 4,180,150 A | 12/1979 | Moore |
| 4,907,692 A | 3/1990 | Sogge |
| 4,981,203 A | 1/1991 | Kornylak |
| 4,981,209 A | 1/1991 | Sogge |
| 5,009,304 A | 4/1991 | Schmalzl |

(Continued)

FOREIGN PATENT DOCUMENTS

| | | |
|---|---|---|
| CN | 102431806 A | 5/2012 |
| CN | 203889594 U | 10/2014 |

(Continued)

OTHER PUBLICATIONS

International Search Report and Written Opinion of the International Searching Authority for PCT/US2013/066942 dated Feb. 17, 2014.

*Primary Examiner* — James R Bidwell

(57) ABSTRACT

A conveying surface is defined by outputs with respective orientations that can be varied while maintaining the input in a constant orientation, and which can be used to more than a single direction. Power may be transmitted from a source of linear power to the conveying surface through rotation about an axis perpendicular to the conveying surface.

24 Claims, 16 Drawing Sheets

(56) References Cited

U.S. PATENT DOCUMENTS

| | | |
|---|---|---|
| 5,195,629 A | 3/1993 | Gottstein |
| 5,971,133 A | 10/1999 | Wilkins |
| 6,244,417 B1 | 6/2001 | Timmer et al. |
| 6,340,083 B1 | 1/2002 | Zhou et al. |
| 7,040,478 B2 * | 5/2006 | Ehlert .................. 198/370.09 |
| 7,506,751 B2 * | 3/2009 | Fourney ............... 198/370.09 |
| 7,588,137 B2 * | 9/2009 | Fourney ..................... 198/779 |
| 8,474,596 B2 | 7/2013 | Wolkerstorfer et al. |
| 8,567,587 B2 * | 10/2013 | Faist et al. .............. 198/370.09 |
| 2009/0200139 A1 | 8/2009 | Kissee et al. |
| 2010/0108468 A1 | 5/2010 | Fourney |
| 2011/0022221 A1 * | 1/2011 | Fourney ............... 198/370.09 |
| 2011/0303512 A1 | 12/2011 | Rau |
| 2012/0080290 A1 | 4/2012 | Fourney |
| 2012/0298481 A1 | 11/2012 | Fourney |
| 2013/0126300 A1 | 5/2013 | Wolkerstorfer et al. |
| 2013/0192954 A1 | 8/2013 | Fourney |
| 2013/0220775 A1 | 8/2013 | Faist et al. |

FOREIGN PATENT DOCUMENTS

| | | |
|---|---|---|
| DE | 202010002285 U1 | 8/2011 |
| EP | 1375389 A1 | 1/2004 |
| EP | 1772401 A1 | 4/2007 |
| JP | H092636 A | 1/1997 |
| JP | H09240818 A | 9/1997 |
| JP | H06298321 A | 10/2014 |
| NL | 1035527 C2 | 12/2009 |
| NL | 1040341 C | 2/2015 |

* cited by examiner

TRANSMISSION HAVING VARIABLE OUTPUT ORIENTATION

BACKGROUND

This application claims priority to U.S. provisional patent application, Ser. No. 61/718,564, which was filed on Oct. 25, 2012, the entirety of which is incorporated herein by reference for all purposes.

BACKGROUND

The present disclosure relates generally to transmissions, and is particularly directed to a transmission in which the output orientation can be varied. The innovation will be specifically disclosed in connection with material handling systems utilizing such variable output orientation transmissions for conveying articles.

Typically the output of a mechanical transmission has a fixed orientation relative to the orientation of the input. Occasionally, though, in many situations there is a need to vary the output orientation relative to the input orientation. One such situation arises with material handling systems.

With material handling systems, it is known to utilize a conveyor to transport a succession of articles along a desired path, to merge or combine a plurality of conveying paths to fewer paths, or to selectively direct articles to respective desired or selected locations or desired paths. For example, sortation conveyors in which articles may be selectively conveyed from the sortation conveyor onto another conveyor or to a desired intermediate or ultimate location by pushers, arms, pop up wheels, cross belts, tilt trays or other suitable structures. Configurations in which articles are selectively directed to one of a plurality of paths from a single conveyor include pick and pass, carton sequencing, work cell and single sort to multiple location configurations. Other examples include aligning conveyors, switching conveyors and merging conveyors. Conveyors are also used to engage sides of articles being transported.

Many different configurations are known for the conveying surface of a single conveyor, such as an endless conveying belt, moving slats or tubes, cross belts, tilt trays, and rollers to name a few. An example of rollers includes elongated cylindrical rollers which may be self driven, such as a motorized drive roller, or driven by an underlying endless belt urged into contact with the rollers. Another example of rollers include individual spaced apart wheels having a small width relative to their diameters which may also be driven by an underlying endless belt urged into contact with the wheels. The circumference of such rollers may be flat, i.e., cylindrical, or arcuate which may have a constant radius, i.e., spherical, or may not.

It is known to configure the conveyor system to be capable of selectively directing articles from the conveying surface so as to following one of a plurality of paths therefrom. Examples of such configurations include a pusher and swinging arm to engage the article and push it sideways. For moving slats or tubes, a traveling pusher configuration may be used. Crossbelt and tilt tray conveyors have individual sections that move as the conveyor and which are selectively actuated to cause the article thereon to move laterally until being discharged therefrom. Conveyors of wheels or elongated rollers may have laterally disposed conveying structures interposed therebetween at divert locations to cause the article to travel laterally to the desired path. In most such configurations, articles may be discharged from the main conveyor in one of two lateral directions the directing and thereof.

Although one or more embodiments will be described herein in connection with variable output orientation transmissions used in material handling systems, it will be understood that the present invention is not limited in use or application thereto. The teachings of the present invention may be used in any application in which variable output orientation transmissions may be beneficially used.

BRIEF DESCRIPTION OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

Figure 1:
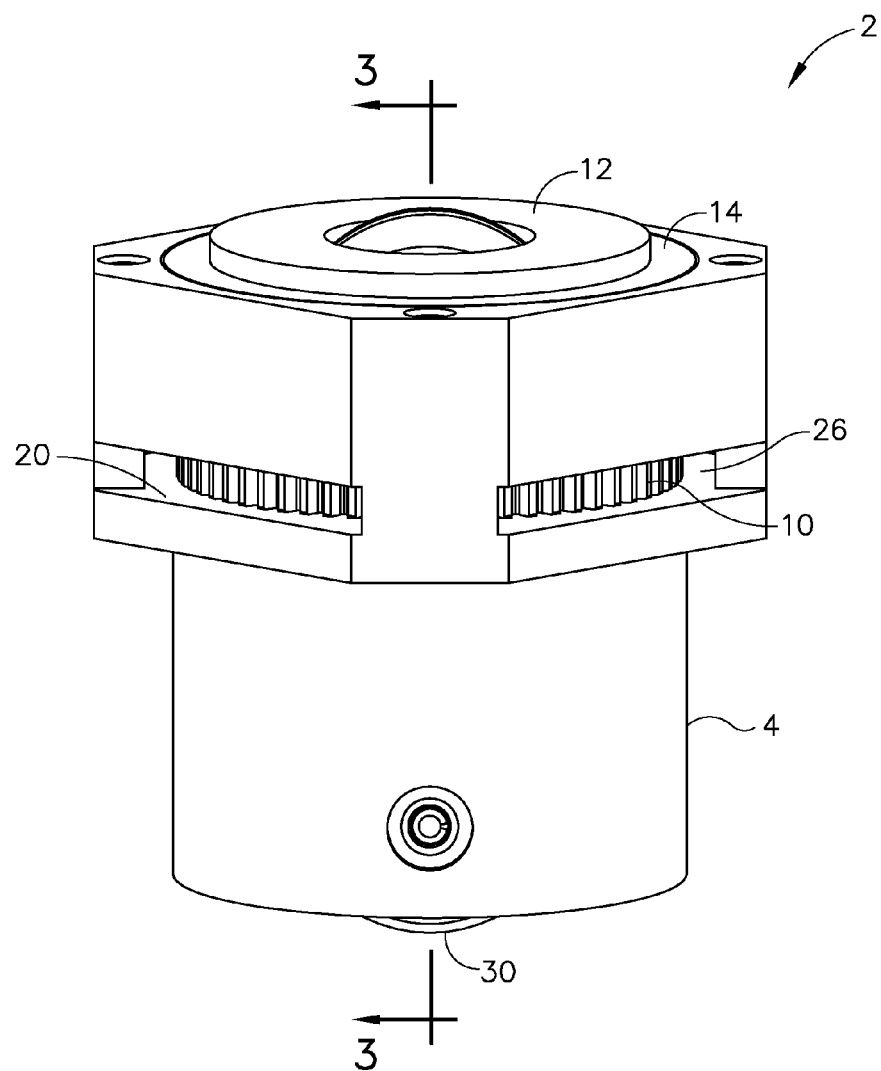
FIG. 1 is a side perspective view of a variable output orientation transmission constructed in accordance with the teachings of the present invention.
Figure 2:
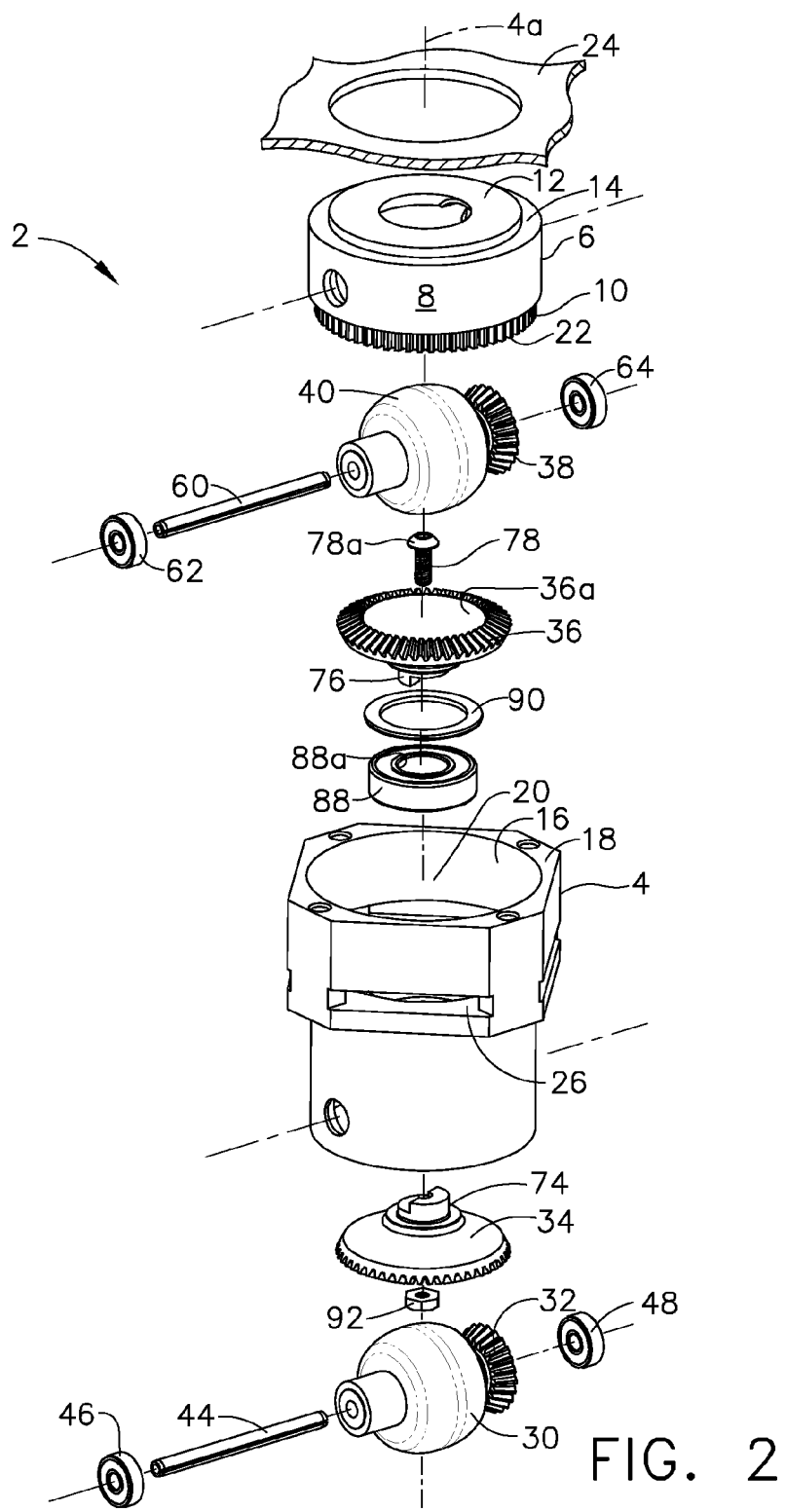
FIG. 2 is an exploded perspective view the transmission of FIG. 1.
Figure 3:
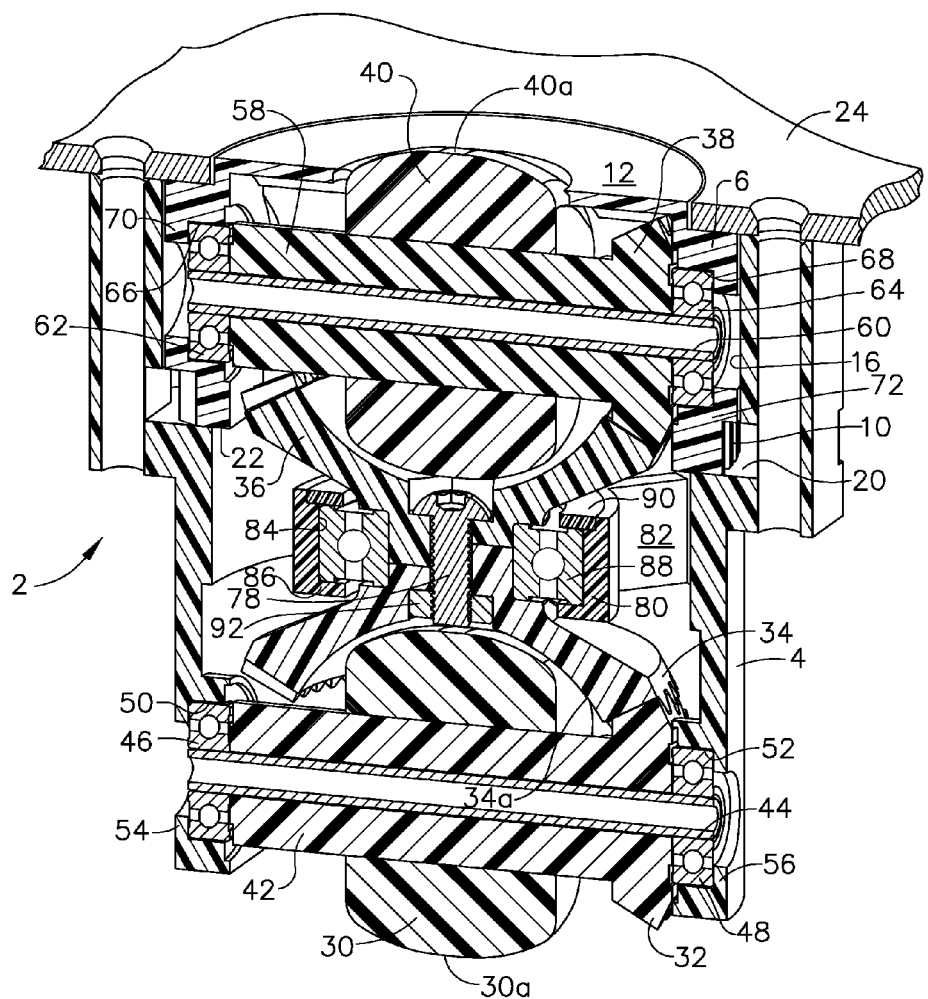
FIG. 3 is cross-sectional perspective view of the transmission of FIG. 1 taken along line 3-3 of FIG. 1.
Figure 4:
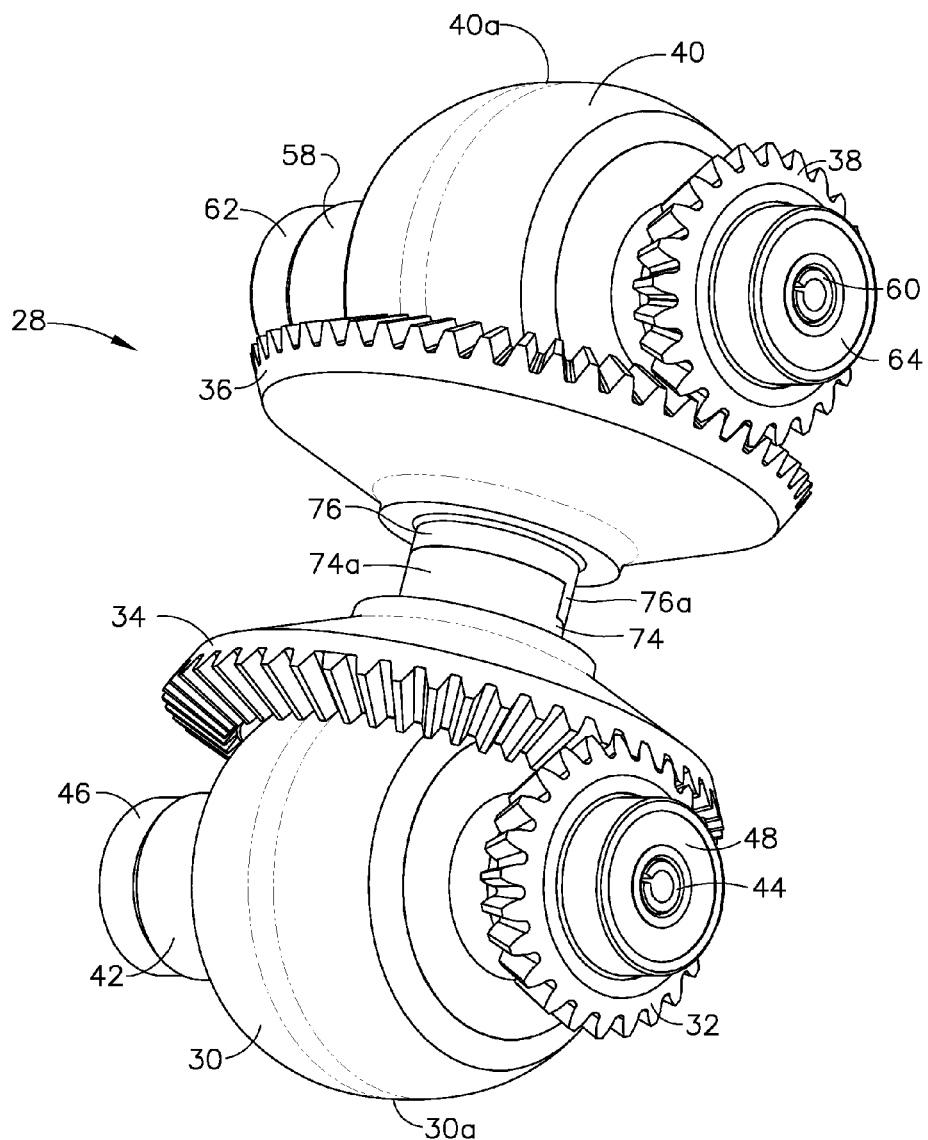
FIG. 4 is perspective view of the drive train of the transmission of FIG. 1.
Figure 5:
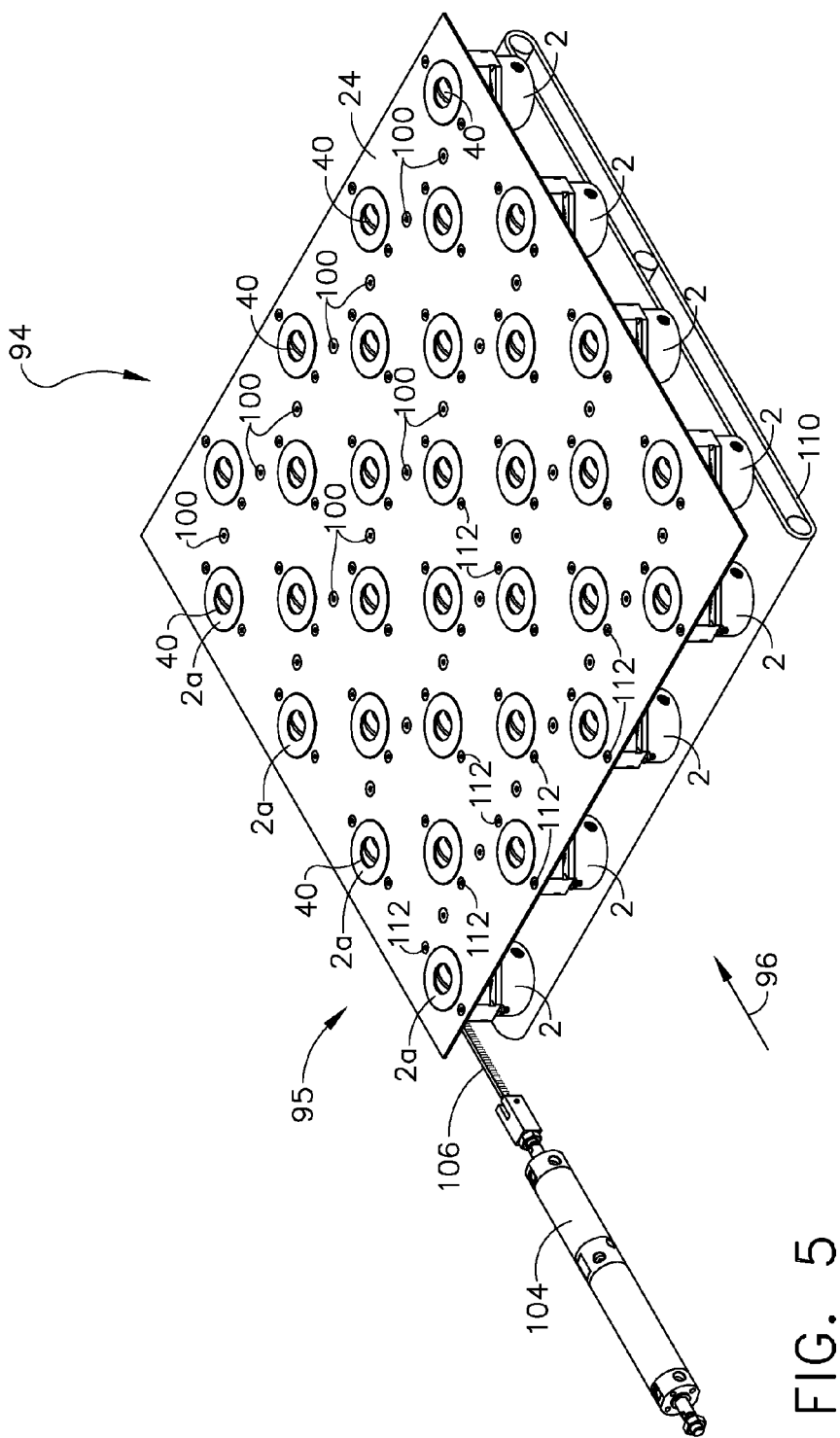
FIG. 5 is a perspective view of a conveyor section comprised of a plurality of variable output orientation transmissions of FIG. 1.
Figure 6:
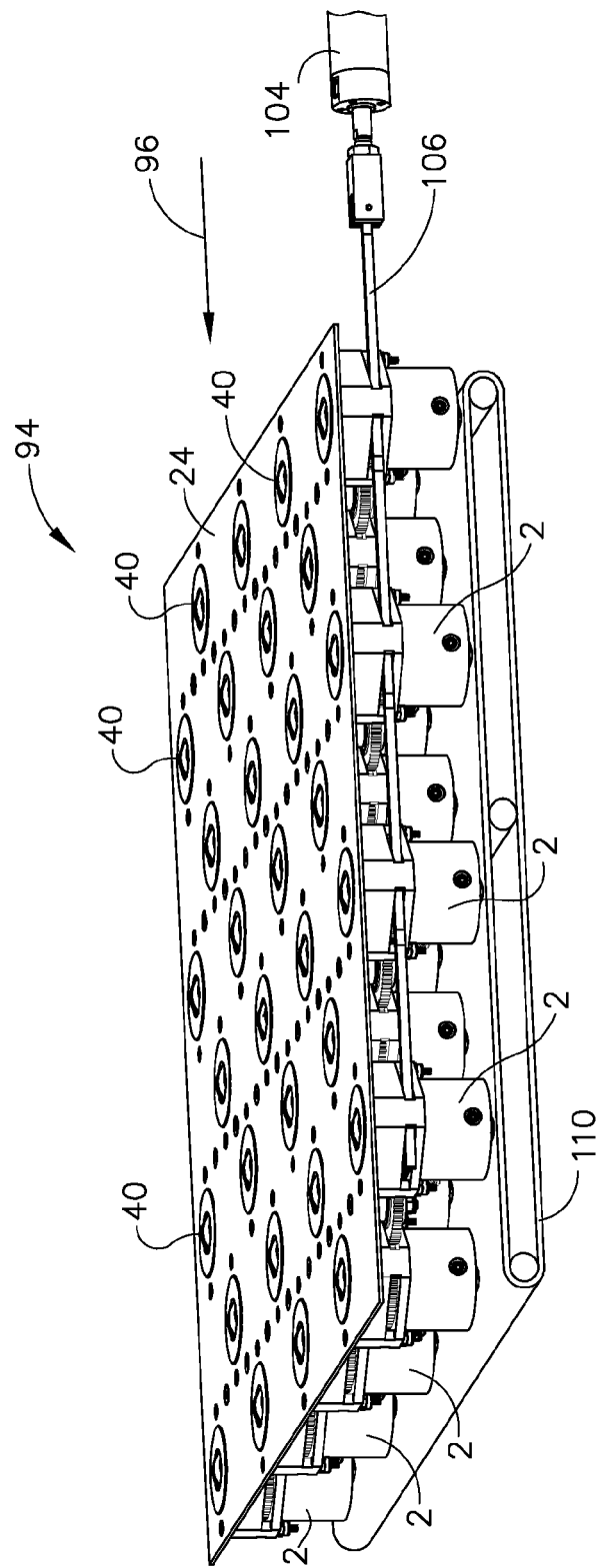
FIG. 6 is perspective view of the conveyor section of FIG. 5 viewed from different angle.
Figure 7:
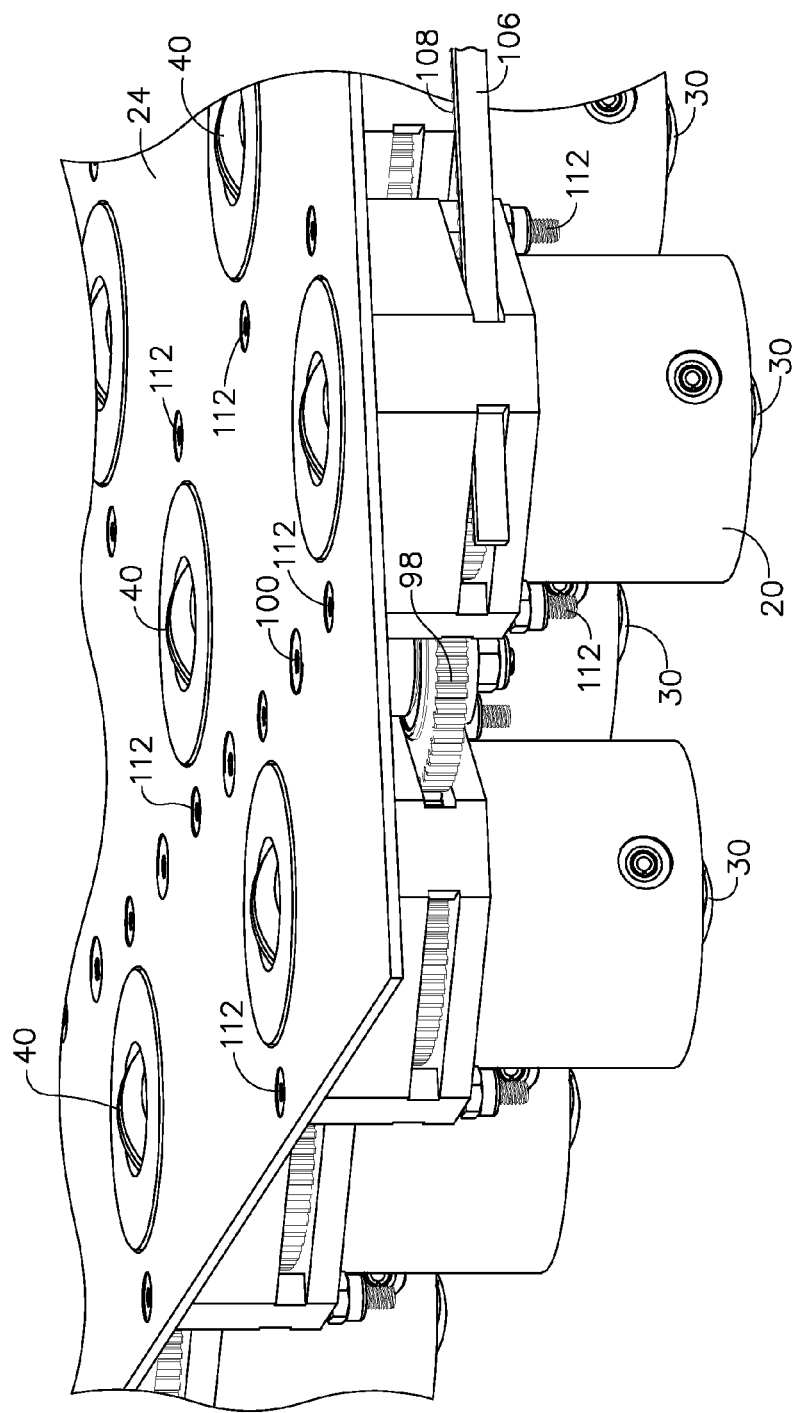
FIG. 7 is an enlarged fragmentary perspective view of the conveyor section of FIG. 5 from the same angle of view as FIG. 6.
Figure 8:
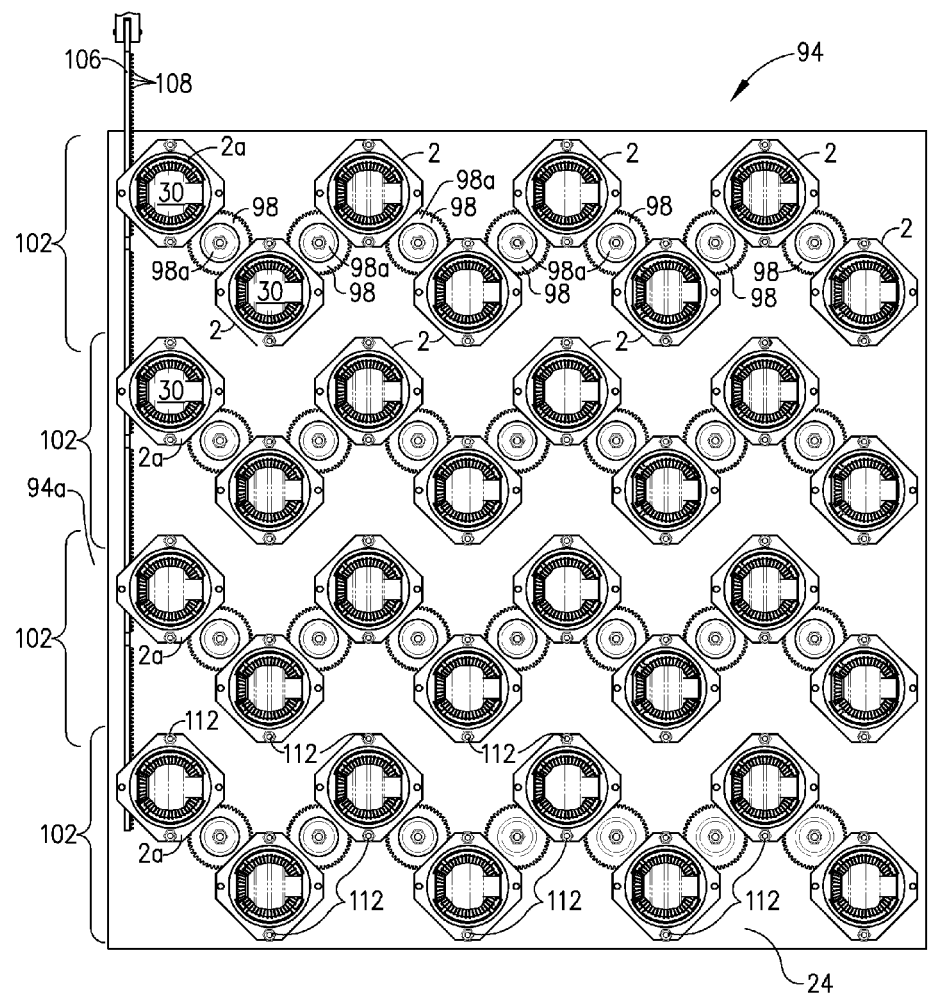
FIG. 8 is a bottom view of the conveyor section of FIG. 5 with the drive conveyor omitted for clarity.
Figure 9:
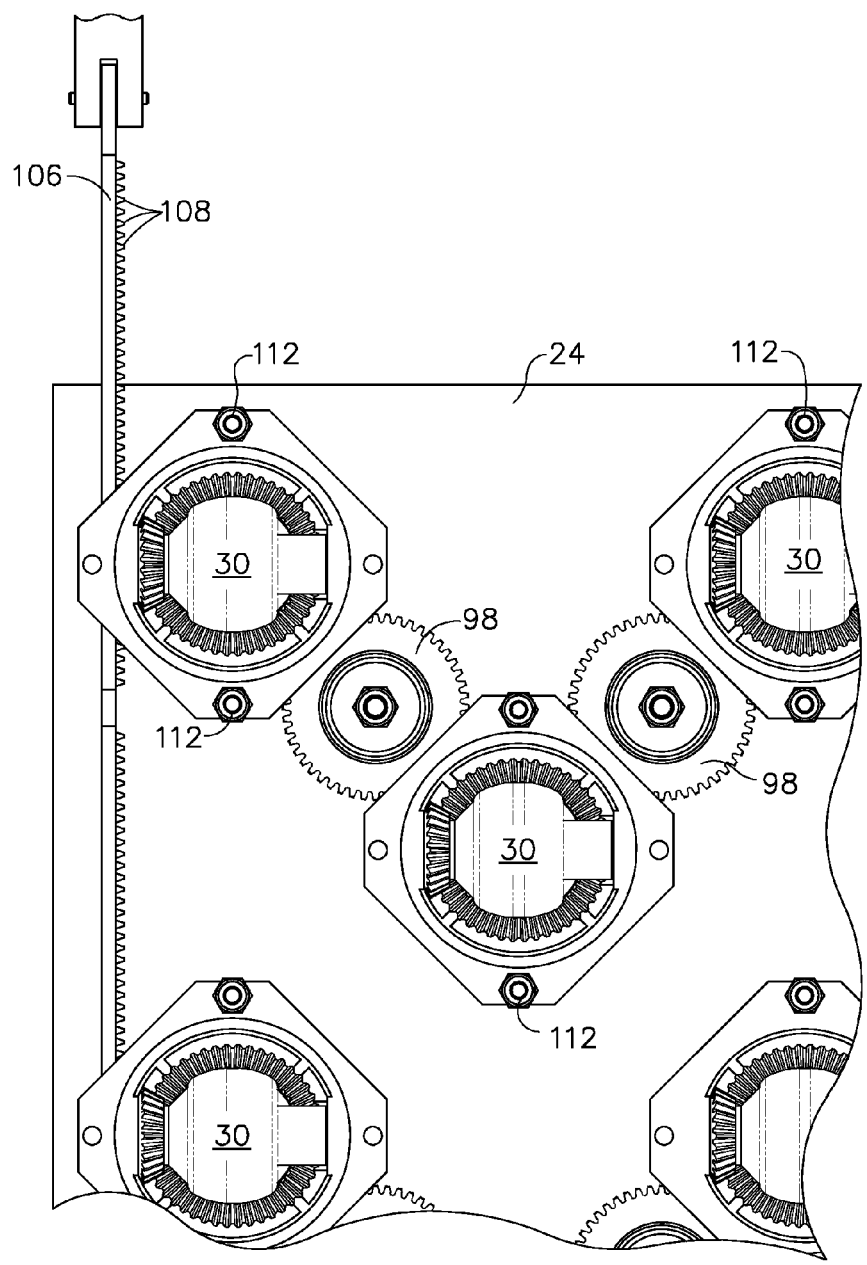
FIG. 9 is an enlarged fragmentary bottom view of the conveyor section of FIG. 5 with the drive conveyor omitted for clarity.

Reference will now be made in detail to one or more embodiments of the invention illustrated in the accompanying drawings.

DETAILED DESCRIPTION

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. Referring in more detail to the drawings, an embodiment of the invention will now be described.

Referring to FIGS. 1-4, transmission 2 (also referred to as drive 2) includes first housing 4 and second housing 6 which are rotatable with respect to each other. In the embodiment depicted, housing 4 is generally used in a fixed orientation while housing 6 is rotatably carried by housing 4. Housing 6 comprises generally cylindrical outer periphery 8, orientation drive element 10 and raised boss 12 surrounded by annular land 14. Housing 4 has generally cylindrical inner wall 16 extending from end 18 which has an axial length and diameter complementary to the length and diameter of cylindrical outer periphery 8 so as to rotatably receive housing 6. Spaced from end 18 is land 20 which supports and locates end 22 of housing 6. The axial distance between end 18 and land 20 is selected relative to the axial dimension between annular land 14 and end 22 so as to avoid binding and friction between housing 6 and support 24 to which transmission 2 is mounted in FIG. 3, thereby permitting relatively free rotation of housing 6 within housing 4 about axis of rotation 4a.

Housing 4 includes opening or window 26 which provides access to orientation drive 10 as will be described below.

Housing 4 and housing 6 carry drive train 28. Drive train 28 is configured to engage as an input linear motion oriented in a first direction lying in a first plane and output linear motion in any direction lying in a second plane which is not necessarily parallel to the first plane. In the embodiment depicted, drive train 28 comprises input drive 30 driving first pinion 32, first bevel 34 driven by first pinion 32, second bevel 36 driven by first bevel 34, second pinion 38 driven by second bevel 36, and output drive 40 driven by second pinion 38. Drive train 28 may include a torque limiter, interposed between any components of drive train 28, which could protect components of drive train 28 in the event output drive 40 is kept from rotating, for example, due to external conditions acting upon output drive 40.

In the embodiment of drive train 28 depicted, input drive 30 is non-rotatably connected to first pinion 32. This is accomplished in the embodiment depicted by first pinion 32 being of unitary construction with first shaft 42, and input drive 30 non-rotatably carried by first shaft 42. Input drive 30 may be connected to first shaft 42 in any suitable manner, such as by press fit, splines, chemical bonding or welding. First pinion 32 and first shaft 42 do not have to be of unitary construction, and could be formed as separate components. Alternatively, input drive 30 could be of unitary construction with first pinion 32. Input drive 30 may be made of any suitable material, such as polyurethane. First pinion 32 may be made of any suitable material, such as such as Delrin® acetal resin or nylon. First shaft 42 may be made of any suitable material, such as glass filled nylon. It is noted that constructing first shaft 42 of a different material from first pinion 32 precludes unitary construction thereof.

Axle 44 defines the axis of rotation of first shaft 42/first pinion 32, being disposed through the hollow interior of first shaft 42/first pinion 32, and supported at each end by one of a pair of spaced apart bearings 46, 48. Bearings 46, 48 are disposed in respective spaced apart aligned bearing bores 50, 52 of housing 4, with shoulders 54, 56 retaining bearings 46, 48. To assemble the embodiment depicted, bearings 46, 48 may be disposed in bores 50, 52, first shaft 42/first pinion 32 aligned with bearings 46, 48, and axle 44 inserted through the center openings of bearings 46, 48 from either side. In the embodiment depicted, axle 44 engages the hollow interior of first shaft 42/first pinion 32 and the inner races of bearings 46, 48 so as not to allow relative motion therebetween. Axle 44 may be of any suitable configuration, such as a shouldered bolt and nut combination, which, combined with molding shoulders 54, 56 to be disposed on the inside of bearings 46, 48, permits assembly thereof from the outside of housing 4.

In the embodiment of drive train 28 depicted, output drive 40 is non-rotatably connected to second pinion 38. This is accomplished in the embodiment depicted by second pinion 38 being of unitary construction with second shaft 58, and output drive 40 non-rotatably carried by second shaft 58. Output drive 40 may be connected to second shaft 58 in any suitable manner, such as by press fit, splines, chemical bonding or welding. Second pinion 38 and second shaft 58 do not have to be of unitary construction, and could be formed as separate components. Alternatively, output drive 40 could be of unitary construction with second pinion 38. Output drive 40 may be made of any suitable material, such as polyurethane. Second pinion 38 may be made of any suitable material, such as such as Delrin® acetal resin or nylon. Second shaft 58 may be made of any suitable material, such as glass filled nylon. It is noted that constructing second shaft 58 of a different material from second pinion 38 precludes unitary construction thereof.

Axle 60 defines the axis of rotation of second shaft 58/second pinion 38, being disposed through the hollow interior of second shaft 58/second pinion 38, and supported at each end by one of a pair of spaced apart bearings 62, 64. Bearings 62, 64 are disposed in respective spaced apart aligned bearing bores 66, 68 of housing 6, with shoulders 70, 72 retaining bearings 62, 64. To assemble the embodiment depicted, bearings 62, 64 may be disposed in bores 66, 68, second shaft 58/second pinion 38 aligned with bearings 62, 64, and axle 60 inserted through the center openings of bearings 62, 64 from either side. In the embodiment depicted, axle 60 engages the hollow interior of second shaft 58/second pinion 38 and the inner races of bearings 62, 64 so as not to allow relative motion therebetween. Axle 60 may be of any suitable configuration In the embodiment depicted, bevel 34 includes coupling 74 extending axially and aligned with the axis of rotation of bevel 34. Bevel 36 includes coupling 76 which is shaped complementarily to coupling 74 and mates therewith. In embodiment depicted, bevel 34 is identical to bevel 36, with coupling 74 being identical to coupling 76 and bevel 34. Such identity is not required.

Couplings 74 and 76 are each cylindrical in shape, and include respective 180° extensions 74a, 76a configured to mate non-rotatably with each other as shown. Fastener 78 holds bevels 34 and 36 together, extending through a hole formed in both couplings 74, 76, generally aligned with the axis of rotation of bevels 34, 36.

Bevels 34, 36 are rotatably supported by housing 4. Housing 4 includes centrally aligned bearing support 80 supported by a plurality of arms 82 extending between bearing support 80 and housing 4. Bearing support 80 includes bearing bore 84 with lip 86. Outer race 88a of bearing 88 is received by bearing bore 84, and retained therein by retaining ring 90. Inner race 88a engages couplings 74, 76, rotatably supporting bevels 34, 36. To assemble the embodiment depicted, bearing 88 is disposed in bearing support 80, and retaining ring 90 installed. Couplings 74, 76 are inserted into inner race 88a from opposite sides and fastener 78 installed. Nut 92 is disposed in a complementarily shaped recess, which is sized and shaped to non-rotatably receive nut 92. Fastener 78 may be tightened via driving head 78a with an appropriate tool. First pinion 32/first shaft 42/input drive 30 may be thereafter installed in housing 4, and housing 6 disposed in housing 4. Assembly of the components carried by housing 4 may be done in any suitable order and manner.

Once the assembly of components carried by housing 4 and assembly of the components carried by housing 6 are complete, housing 6 may be disposed in housing 4 such that second pinion 38 mates with bevel 36. Once housing 4 is secured to support 24 through a plurality of fasteners, housing 6 is retained axially.

The embodiment depicted illustrates a 1:1 overall drive ratio: Since the first drive ratio (first pinion 32 to bevel 34) is the inverse of the second drive ratio (bevel 36 to second pinion 38). By varying the first and second drive ratios, the overall drive ratio may be varied, producing a speed reduction or multiplier. In the embodiment depicted, each pinion/bevel set is depicted as a gear set, providing positive drive. However, the pinions and bevels do not have to have gear teeth. Any other suitable drive configuration between each pinion/bevel may be used as long as power is transmitted therebetween. For example, the drives could transmit power through frictional engagement, such as friction wheels. It is desirable that the drives be as efficient as possible, such as that provided by the positive drive of intermeshing teeth interface between the pinions and the bevels.

As depicted, input drive 30 and output drive 40 are respectively disposed partially within complementarily shaped central recesses 34a, 36a of bevels 34, 36 each configured to receive a portion of input drive 30 and output drive 40 respectively, minimizing the overall height of drive 2. In the embodiment depicted, input drive 30 and output drive 40 are illustrated as an input roller and an output roller which are rotatable about an axis and having outer peripheral drive surfaces 30a, 40a which are configured as being generally flat in the direction perpendicular to the axis of rotation 4a, having a width suitable for the particular use of drive 2. For example, while a wider drive surface may be suitable to transmit higher forces without slippage, a narrow drive surface permits rotation relative to a planar surface that engages it, such as the bottom of an article being conveyed, without skewing. Input drive 30 and output drive 40 can have any suitable outer peripheral drive surface configuration for the power being inputted or outputted, such as the circumferential drive surfaces depicted. Although outer circumferential drive surfaces 30a, 40a are depicted as having a constant radius, peripheral drive surfaces with non-constant or non-uniform radii might be used, such as configured to engage a source of input power complementarily configured to deliver input power to such a peripheral drive surface, or configured to output power with such a non-constant or non-uniform radii. As used herein, linear and planar includes input and output power through such peripheral drive surfaces. The arcuate shape of input drive 30 and output drive 40 depicted allows a more vertically (in the embodiment depicted in the direction axis of rotation 4a) compact drive 2 while allowing input drive 30 and output drive 40 to extend farther from their axes of rotation about pins 44, 60, respectively. Axis of rotation 4a is intersects the high point of output drive 40, the nominal contact point between output drive 40 and an article supported by output drive 40. This configuration avoids changing article orientation when the output orientation of output drive 40 is varied, such as by rotation of housing 6 relative to housing 4, while output drive 40 is in contact with an article, because the point of contact between the article and output drive 40 is aligned with the axis of rotation of the output drive 2.

As mentioned, the output orientation of transmission 2 may be varied by rotating housing 6 relative to housing 4. Referring to FIGS. 5-9, there is shown conveyor section 94 comprising a plurality of spaced apart transmissions 2 disposed to selectively convey articles entering conveyor section 94 traveling in the longitudinal direction of arrow 96 from an upstream (not shown). Conveyor section 94, which may also referred to as a conveyor or a conveyor module, may be of any length and shape suitable for the purpose of conveyor section 94. Transmissions 2 are disposed in a pattern sufficiently close enough to ensure that articles are carried by output drives 40 of transmissions 2, not dragging on support 24. The variable orientations of output drives 40 are synchronized to function together as a single conveying surface lying in a first plane, comprised of discrete drives that can be synchronously oriented to convey articles in any desired path.

Transmissions 2 are interconnected through respective idlers 98 interposed to engage orientation drive elements 10 of adjacent transmissions 2 such that the orientations of output drives 40 are aligned. Idler 98 are rotatably carried by support 24, mounted on respective bearings 98a and secured to support 24 by respective fasteners 100. In the embodiment depicted, transmissions 2 are interconnected into rows 102, such that controlled rotation of one controlled transmission 2a of a row 102 results in rotation of all transmissions 2 of that row 102. In the depicted embodiment, transmissions 2a are those along longitudinal side 95 of conveyor section 94. Any suitable number of rows 102 may be used, with any suitable number of transmissions 2 in each row 102.

Rotation of each controlled transmission 2a is synchronized, which may be accomplished by each controlled transmission 2a having a respective individual actuator. In the depicted embodiment, single actuator 104 controls rotation of all controlled transmission 2a in conveyor section 94. Actuator 104, which may be pneumatic, hydraulic or electrically operated to reciprocate element 106, which in the embodiment depicted is disposed through windows 26 of controlled transmissions 2a to be retained adjacent orientation drive elements 10. Element 106 is configured as a rack of a plurality of teeth 108 which engage complementary shaped teeth of respective orientation drive elements 10 of controlled transmissions 2a.

Element 106 may have teeth 108 along its entire length, with actuator 104 configured to move element 106 so as to achieve a full 360° rotation of output drives 40. It is noted that only 180° of rotation may be required when coupled with the ability to move endless drive belt 110 bi-directionally. An endless belt may be of unitary construction, or have ends joined together such as by a permanent splice or a detachable splice (such as mechanical splice).

Endless drive belt 110 lies in a second plane below the first plane defined by output drives 40. Endless drive belt 110 is disposed adjacent the plurality of input drives 30 in driving relation thereto. Input drives 30 are configured to engage endless drive belt 110 with their circumferential drive surfaces 30a. Input drives 30 are rotationally aligned with the direction of motion of belt, in the longitudinal direction, fixed by the mounting of transmissions 2 to support 24 through fasteners 112. Linear movement of endless drive belt 110 functions as a source of linear power or motion and causes input drives 30 to rotate, resulting in rotation of output drives 40, thereby outputting linear motion in the first plane. Input drives 30 may receive linear power from any suitable source, such as by circumferential drive surfaces 30a engaging the circumferences of a rotating shaft such as a driven roller or a Motorized Drive Roller.

In the embodiment depicted, with actuator 104 in the position shown, advancing endless drive belt 110 in the direction of arrow 96 causes output drives 40 to rotate so as to advance articles carried thereon to advance in the direction of arrow 96. Regardless of the input direction provided by endless drive belt 110, the output direction may be in any direction, ranging from the same direction to the opposite direction. Actuation of actuator 104 so as to rotate housings 6 180° would result in articles carried by output drive 40 to advance in the direction opposite arrow 96. As will be appreciated, actuator 104 may be actuated to rotate output drives 40 clockwise or counter clockwise at any angle between −180° (counterclockwise from the top) and +180° (clockwise from the top) providing controllable variable output orientation for transmissions 2. This allows conveyor section 94 to direct articles in 360° of direction. If endless drive belt 110 is configured to be driven bi-directionally, actuator 104 need only be configured to rotate output drives 40 clockwise or counter clockwise at any angle between −90° (counterclockwise from the top) and +90° (clockwise from the top) to achieve the ability to direct articles in 360° of direction. If no more than a 90° divert is desired, with a bi-directional source of power, conveyor section 94 need only to be configured to rotate output drives 40 clockwise or counter clockwise between 0° and 90° in one direction (whether clockwise or counterclockwise).

When output drives 40 transmit power, such as when conveying articles, the reaction force between input drives 30 and their source of power, in the embodiment depicted endless drive belt 110, increases as power is required to convey articles. Since the present invention allows input drives 30 to remain aligned with their source of power, the reaction force remains aligned with that source of power regardless of the orientation of output drives 40. Thus, input drives 30 of the present invention do not produce a skewing or mistracking force on the endless drive belt 110, and there is no scuffing due to a difference in the force vectors.

Figure 10:
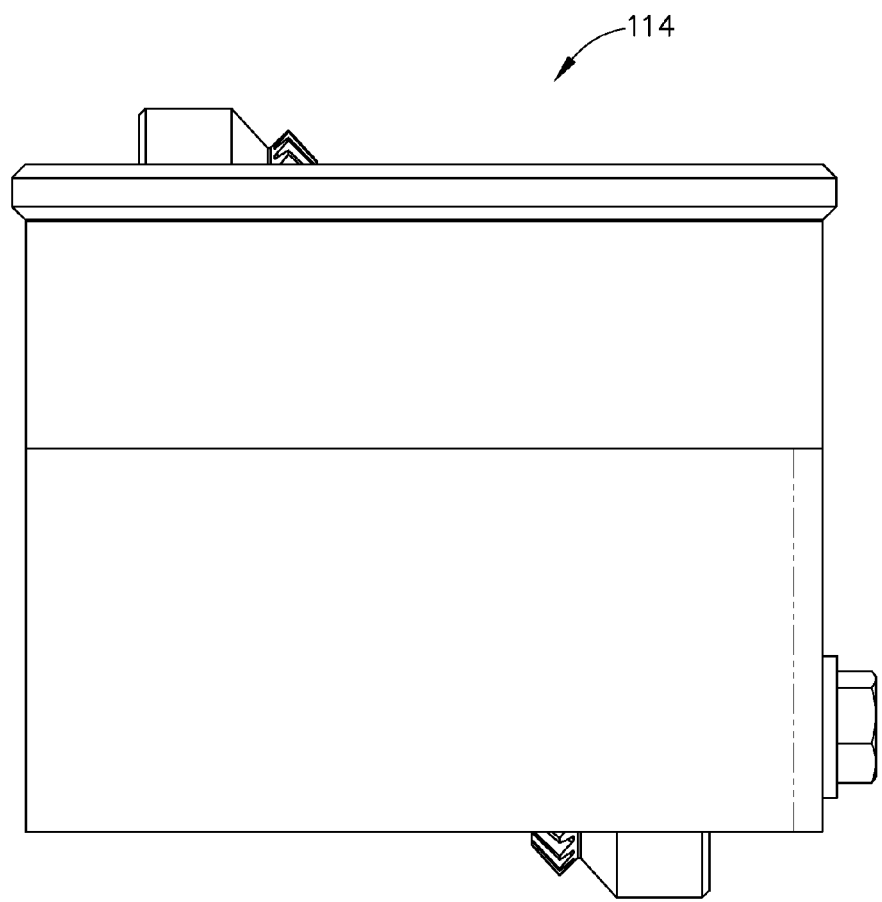
FIG. 10 is a side view of another embodiment of a variable output orientation transmission constructed in accordance with the teachings of the present invention.
Figure 11:
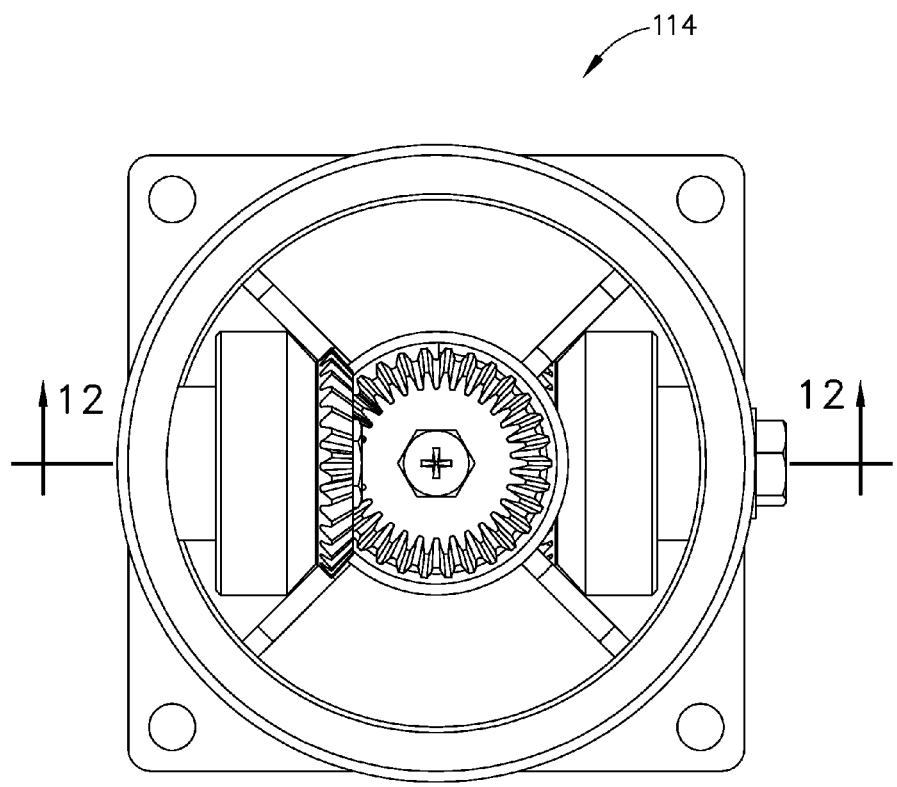
FIG. 11 is a top view of the transmission of FIG. 10.
Figure 12:
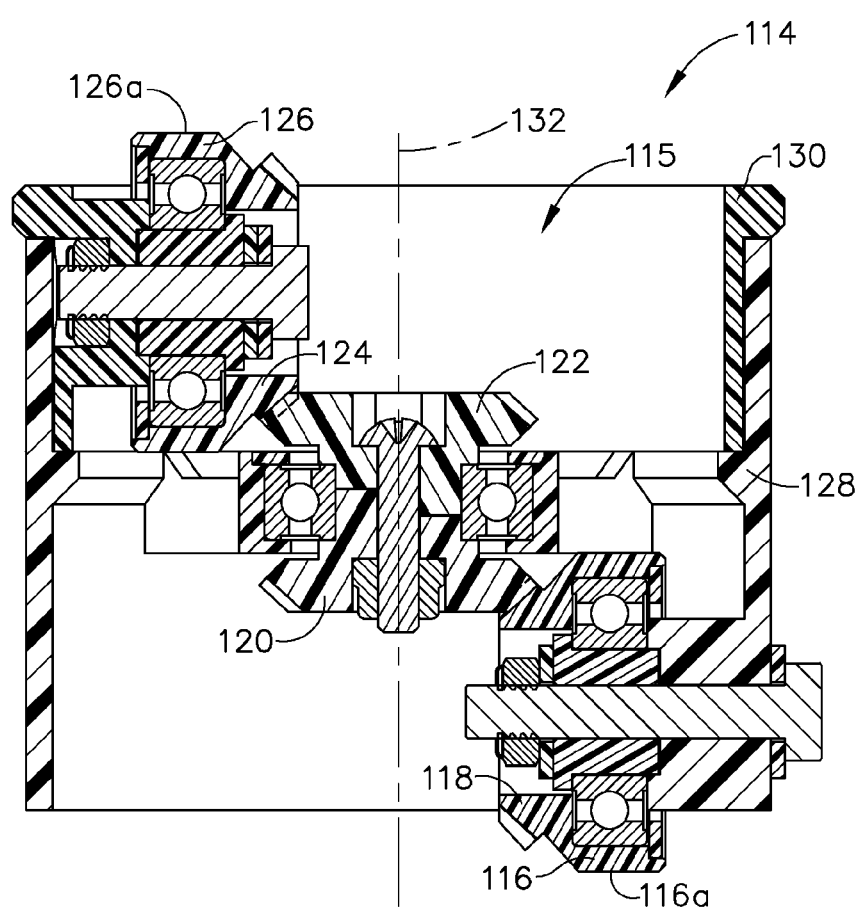
FIG. 12 is cross-sectional side view of the transmission of FIG. 10 taken along line 12-12 of FIG. 11.

Referring to FIGS. 10-12, another embodiment of a drive train 115 of a variable output orientation transmission 114 is illustrated. Input drive 116 is non-rotatably connected to first pinion 118, first bevel 120 driven by first pinion 118, second bevel 122 non-rotatably connected to and driven by first bevel 120, second pinion 124 driven by second bevel 122, and output drive 126 non-rotatably connected to and driven by second pinion 124.

Input drive 116 and output drive 126 are configured as having cylindrical outer peripheral drive surfaces 116a, 126a. Housing 128 carries input drive 116, first pinion 118, first bevel 120 and second bevel 122. Housing 130 is rotatably received and carried by housing 128, and carries second pinion 124 and output drive 126. Rotation of housing 130 relative to housing 128, which may be accomplished in any suitable manner, varies the output orientation of output drive 126. It is noted that in the configuration of drive train 115, output drive 126 is offset, not aligned with vertical axis of rotation 132. The article orientation may change when housing 130 is rotated because the point of contact between the article and output drive 126 is not aligned with the axis of rotation of output drive 126. It is also noted that the mounting of transmission 114 to a conveyor support (not shown) and orientation drive element (not shown) may be configured as discussed above with respect to housing 4 and housing 6.

Figure 13:
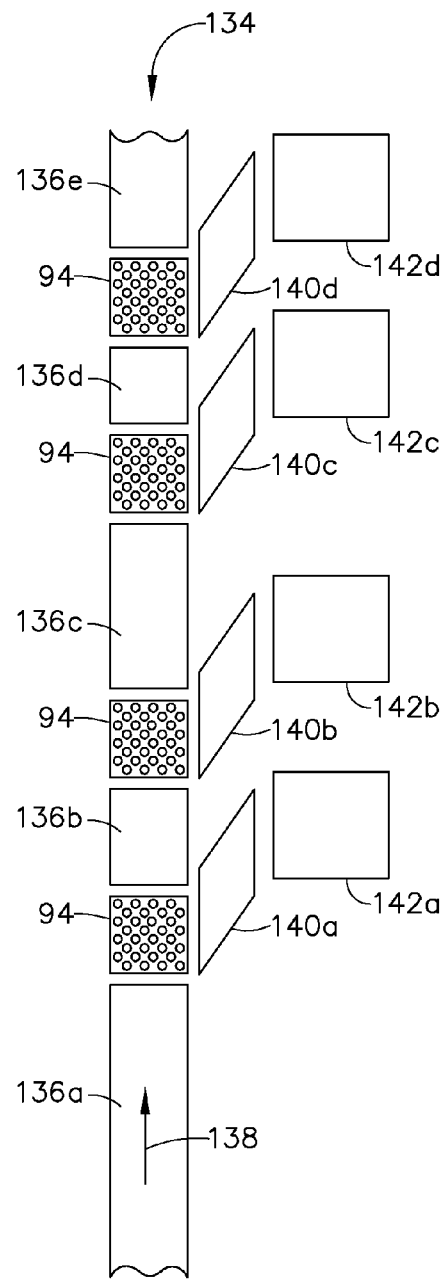
FIG. 13 is a diagrammatic plan view of a sortation conveyor system of a material handling system comprising a plurality of conveyor sections which comprise a plurality of variable output orientation transmission constructed in accordance with the teachings of the present invention.

FIGS. 13-18 diagrammatically illustrate examples of systems embodying one or more conveyors constructed in accordance with the teachings of the present invention. FIG. 13 illustrates sortation system 134 having a plurality of conveyor sections 136a-136e and one or more conveyor sections 94 interposed between respective conveyor sections 136a-136e, with each conveyor section 94 being a divert location at which articles moving on conveyor system 134 in the direction of travel arrow 138 may selectively be diverted to a respective associated after sort conveyor 140a-140d which feeds a respective associated downstream conveyor 142a-142d. Although after sort conveyors 140a-140d are diagrammatically illustrated as straight conveyors, they may be curved. Respective drives 2 of any conveyor section 94 may be selectively actuated at an appropriate time to divert an article carried by sortation system 134 onto an appropriate after sort conveyor 140 while maintaining the orientation of the article relative to the direction the article is traveling.

Figure 14:
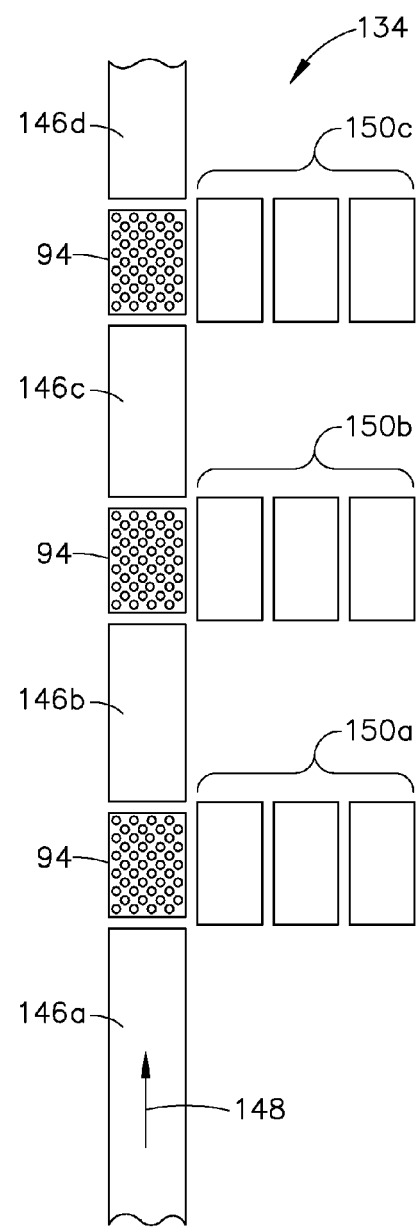
FIG. 14 is a diagrammatic plan view of a right angle sortation conveyor system of a material handling system comprising a plurality of conveyor sections which comprise a plurality of variable output orientation transmission constructed in accordance with the teachings of the present invention.

FIG. 14 diagrammatically illustrates right angle sortation system 144 having a plurality of conveyor sections 146a-146d and one or more conveyor sections 94 interposed between respective conveyor sections 146a-146d, with each conveyor section 94 being a divert location at which articles moving on conveyor system 144 in the direction of travel arrow 148 may selectively be diverted to a respective associated after sort conveyor 150a-150c disposed at a 90° angle to the direction of travel. Respective drives 2 of any conveyor section 94 may be selectively actuated at an appropriate time to orient drives 2 to divert an article carried by sortation system 144 onto an appropriate after sort conveyor 140 while changing the orientation of the article by 90° relative to the direction the article is traveling.

Figure 15:
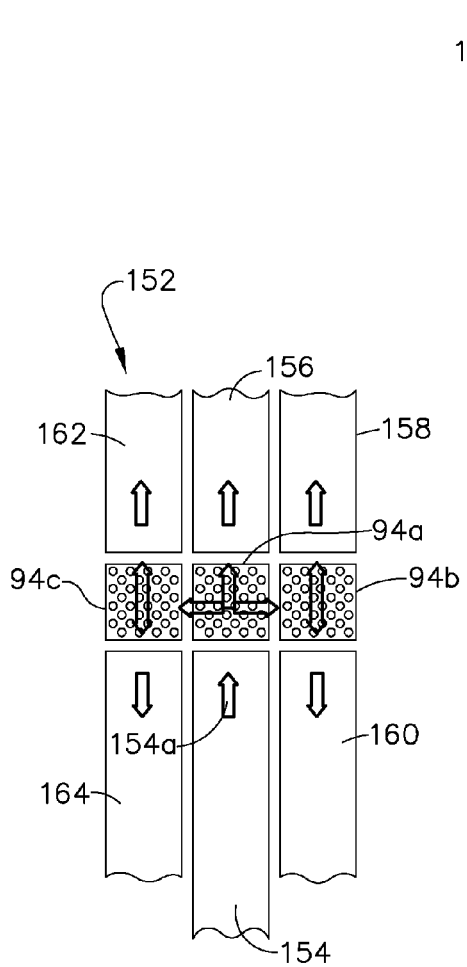
FIG. 15 is a diagrammatic plan view of a pick and pass system of a material handling system comprising a plurality of conveyor sections which comprise a plurality of variable output orientation transmission constructed in accordance with the teachings of the present invention.

FIG. 15 diagrammatically illustrates pick and pass system 152 having feed conveyor 154 traveling in the direction of travel indicated by arrow 154a. Articles discharged onto conveyor section 94a by feed conveyor 154 may be selectively advanced without diversion onto conveyor 156 by orienting drives 2 of conveying section 94a to so direct articles. By actuating drives 2 of conveying section 94a to orient 90° relative to arrow 154a, articles may be discharged 90° onto conveyor section 94b, with drives 2 of conveying sections 94b being oriented in alignment with drives 2 of conveying section 94a to receive such articles. Drives 2 of conveying section 94b may then be actuated to orient drives 2 90° to discharge such articles onto either conveyer 158 or 160. Similarly, by actuating drives 2 of conveying section 94a to orient in the opposite 90° direction relative to arrow 154a, articles may be discharged 90° onto conveyor section 94c, with drives 2 of conveying sections 94c being oriented in alignment with drives 2 of conveying section 94a to receive such articles. Drives 2 of conveying section 94c may then be actuated to orient drives 2 90° to discharge such articles onto either conveyer 162 or 164.

Figure 16:
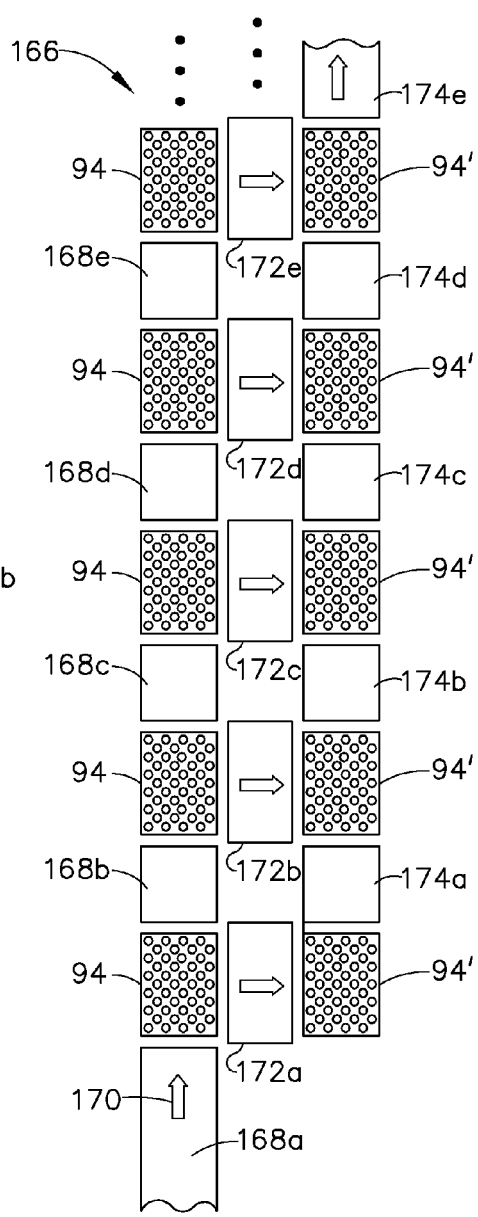
FIG. 16 is a diagrammatic plan view of a carton sequencing system of a material handling system comprising a plurality of conveyor sections which comprise a plurality of variable output orientation transmission constructed in accordance with the teachings of the present invention.

FIG. 16 diagrammatically illustrates article sequencing system 166 having a plurality of conveyor sections 168a-168e and one or more conveyor sections 94 interposed between respective conveyor sections 168a-168e. Drives 2 of each respective conveyor section 94 may be selectively actuated to divert the randomly arriving articles traveling in the direction of arrow 170 onto a respective 90° lateral conveyor 172a-172e. Lateral conveyors 172a-172e may hold or immediately discharge such articles onto respective downstream conveyor sections 94' whose drives 2 are initially oriented to receive the articles from its associated upstream lateral conveyor 172a-172e. Conveyor sections 94' may hold or immediately discharge articles onto a respective downstream conveyor 174a-174e, by reorienting drives 2 90°. Conveyors 174a-174e may also hold or immediately discharge articles, with the orientation of drives 2 of downstream conveyor sections 94' oriented appropriated. Depending on the control configuration, articles could be conveyed to and held on conveyors 172a-172e as they arrive and released simultaneously to conveyor sections 94' as a slug, with conveyor sections 94' and conveyors 174a-174e holding or immediately releasing the slug. Similarly, articles could be conveyed to and held on conveyors 94' as they arrive and released simultaneously.

Figure 17:
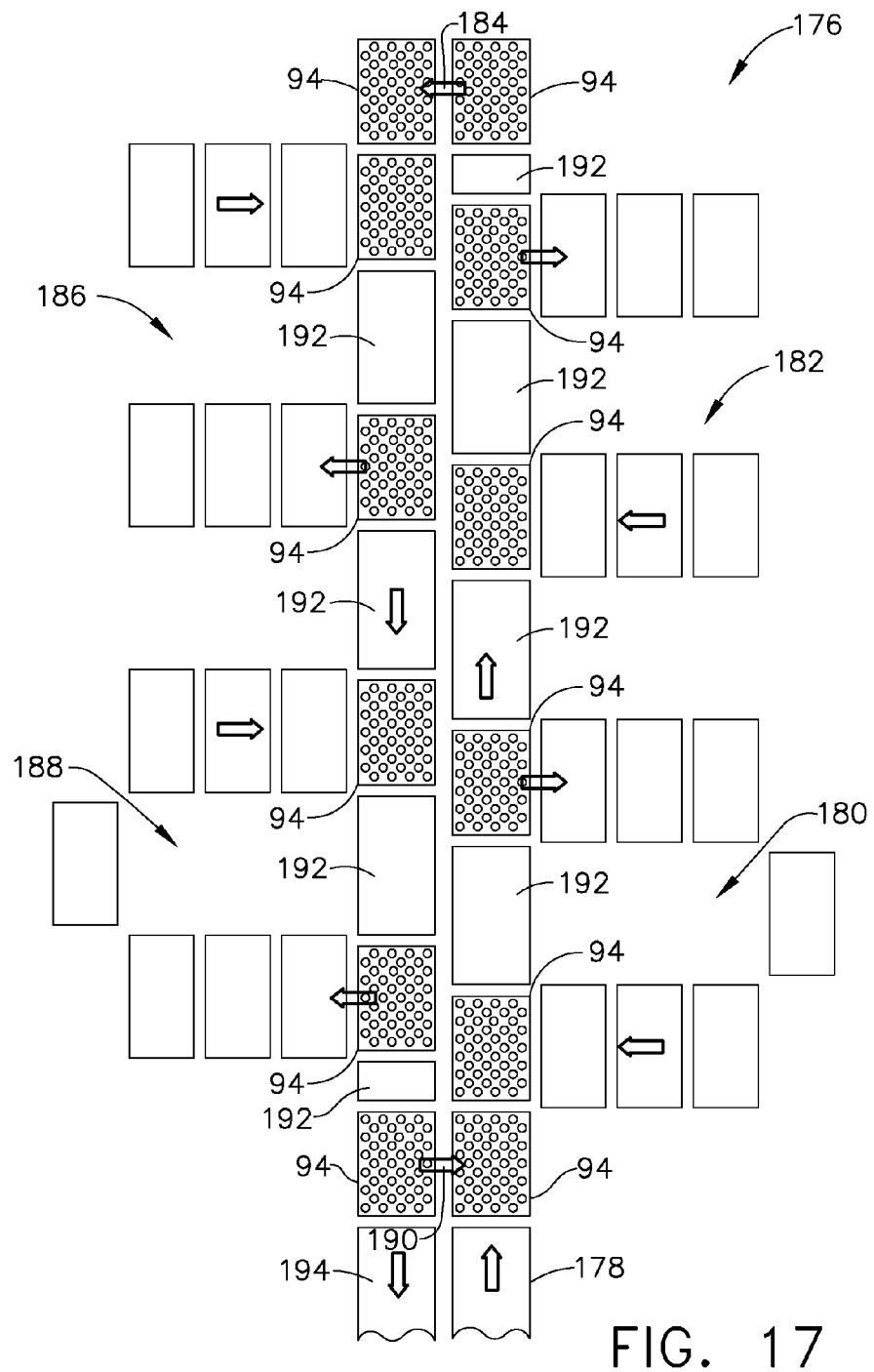
FIG. 17 is a diagrammatic plan view of a work cell or an automatic storage and retrieval system of a material handling system comprising a plurality of conveyor sections which comprise a plurality of variable output orientation transmission constructed in accordance with the teachings of the present invention.

FIG. 17 diagrammatically illustrates system 176 of both work cells 180, 188 and automatic storage and retrieval 182, 186, having feed conveyor 178 and an arrangement of interposed conveyor sections 94 and conveyors 192 for selectively advancing articles to discharge conveyor 194. Drives 2 of conveyor sections 94 are actuated to be oriented to advance articles in the desired direction, whether to deliver articles to or receive articles from work cells 180, 188, to deliver articles to or receives articles from automatic storage and retrieval 182, 186, or to advance articles toward discharge conveyor 194. In this configuration, articles may recirculate within system 176 following arrow 190.

Figure 18:
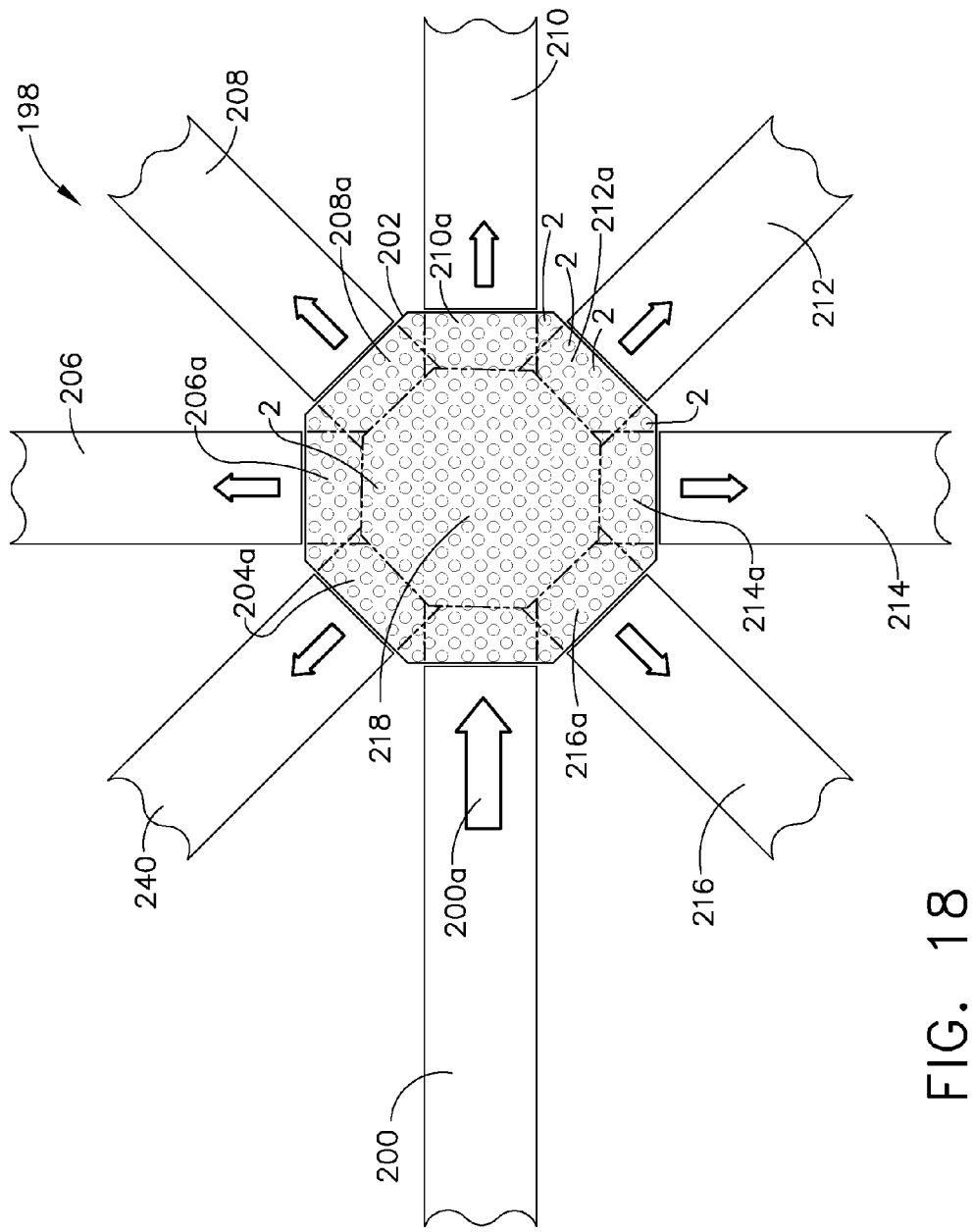
FIG. 18 is a diagrammatic plan view of a single sort to multiple destination conveyor system of a material handling system comprising a plurality of conveyor sections which comprise a plurality of variable output orientation transmission constructed in accordance with the teachings of the present invention.

FIG. 18 diagrammatically illustrates single sort to multiple destination conveyor system 198 includes feed conveyor 200 which delivers articles to central conveyor section 202. Central conveyor section 202 comprises a plurality of variable output orientation drives 2 constructed in accordance with the teachings of the present invention, which may be actuated to orient drives 2 to selectively discharge articles to one of a plurality of discharge conveyors 204, 206, 208, 210, 212, 214 and 216. Central conveyor section 202 may comprise independently controllable zones, such as central zone 218 and discharge zones 204a, 206a, 208a, 210a, 212a, 214a and 216a that are associated with an associated discharge conveyor 204, 206, 208, 210, 212, 214 and 216. Discharge zones 204a, 206a, 208a, 210a, 212a, 214a, 216a and 218 may overlap. The orientation of drives 2 within respective discharge zones 204a, 206a, 208a, 210a, 212a, 214a, 216a and 218 are controlled such that articles arriving from feed conveyor 200 may be selectively directed to any of one or more of discharge conveyors 204, 206, 208, 210, 212, 214 and 216. In one embodiment of the present invention, drives 2 may be individually controlled or controlled as small groups, with the orientation of drives 2 of variable groupings being synchronized to advance articles in desired paths to desired locations, such as discharge conveyors 204, 206, 208, 210, 212, 214 and 216. The smaller the size of any control grouping of drives 2, the greater control over and resolution of the path of an articles on central conveyor 218.

The foregoing description has been presented for purposes of illustration and description. It is not intended to be exhaustive or to limit the invention to the precise form disclosed. Obvious modifications or variations are possible in light of the above teachings. The embodiment was chosen and described in order to illustrate the principles of the invention and its application to thereby enable one of ordinary skill in the art to utilize the invention in various embodiments and with various modifications as are suited to the particular use contemplated. Although only a limited number of embodiments of the invention is explained in detail, it is to be understood that the invention is not limited in its scope to the details of construction and arrangement of components set forth in the preceding description or illustrated in the drawings. The invention is capable of other embodiments and of being practiced or carried out in various ways. Also, specific terminology was used herein for the sake of clarity. It is to be understood that each specific term includes all technical equivalents which operate in a similar manner to accomplish a similar purpose. It is intended that the scope of the invention be defined by the claims submitted herewith.

The invention claimed is:

1. A conveyor having a conveying surface for conveying articles carried by the conveying surface, said conveyor comprising:
   a. at least one source of linear power, the linear power having a first direction;
   b. a plurality of drives, each drive comprising:
      i. an input drive rotatable about an input axis and configured to receive linear power from the at least one source of linear power, the input axis being generally perpendicular to the first direction;
      ii. an output drive rotatable about an output axis and operably connected to the input drive, the output drive having an orientation which may be varied; and
      iii. a drive train, the input drive operably driving the output drive through the drive train, the drive train comprising:
         a first element (bevel gear) which is rotatably driven about a first axis by the input drive, the first axis being generally perpendicular to the conveying surface,
         a second element rotatable about a second axis, the second axis being perpendicular to the first axis, the input drive operably driving the first element through the second element; and
         a third element rotatable about a third axis, the third axis being perpendicular to the first axis, the input drive operably driving the third element through the first element and the second element.

2. The conveyor of claim 1, wherein each drive comprises a housing having a rotatable portion which is rotatable about an orientation axis, the orientation axis being perpendicular to the conveying surface, the rotatable portion of the housing rotatably carrying the output drive, the orientation of the output drive being varied by rotation of the rotatable portion of the housing about the orientation axis.

3. The conveyor of claim 2, wherein the orientation axis is coincident with the first axis.

4. The conveyor of claim 2 wherein each housing has a fixed portion secured to the conveyor in a fixed orientation to rotatably support the rotatable portion of the housing.

5. The conveyor of claim 4, wherein the orientation of the rotatable portion of the housing is movable about the first axis of rotation up to about 360 degrees.

6. The conveyor of claim 5, comprising an actuator operably coupled to a plurality of the drives to rotate each of the plurality of drives about said first axis of rotation.

7. The conveyor of claim 6 wherein an element operably couples the actuator is o to the plurality of the drives by an element.

8. The conveyor of claim 6 wherein the element passes through the fixed portion of the drives to operatively engage the rotatable portion of the housing.

9. The conveyor of claim 4 wherein the output drive protrudes from the rotatable portion of the housing and the input drive protrudes from the fixed portion of the housing.

10. The conveyor of claim 1, where the second axis is coincident with the input axis.

11. The conveyor of claim 1, wherein the third axis is coincident with the output axis.

12. The conveyor of claim 1, wherein the first element includes at least one recess, at least one of the input drive and the output drive partially disposed in a respective one of the at least one recess.

13. The conveyor of claim 1 wherein the first element comprises a first bevel and a second bevel.

14. A conveyor having a conveying surface for conveying articles carried by the conveying surface, said conveyor comprising:
   a. at least one source of linear power, the linear power having a first direction;
   b. a plurality of drives, each drive comprising:
      i. an input drive rotatable about an input axis and configured to receive linear power from the at least one source of linear power, the input axis being generally perpendicular to the first direction;
      ii. an output drive rotatable about an output axis and operably connected to the input drive, the output drive having an orientation which may be varied; and
      iii. a drive train, the input drive operably driving the output drive through the drive train, the drive train comprising a first element which is rotatably driven about a first axis by the input drive, the first axis being generally perpendicular to the conveying surface, wherein each drive train comprises:
         a. a first pinion rotatable about the input axis and operably driven by the input drive;
         b. a second pinion rotatable about the output axis and operably driving the output drive; and
         c. the first element comprising a first bevel and a second bevel, the first bevel operably driven by the first pinion and the second bevel operably driving the second pinion.

15. The conveyor of claim 14, wherein the first bevel comprises a first recess, the input drive partially disposed in the first recess.

16. The conveyor of claim 15, wherein the second bevel comprises a second recess, the output drive partially disposed in the second recess.

17. The conveyor of claim 16, wherein the first bevel and the second bevel connect together in an hourglass shaped configuration.

18. The conveyor of claim 16 wherein each drive comprises a housing having a fixed portion and a rotatable portion surrounding the gear train with the input drive carried by the fixed portion and the output drive carried by the rotatable portion.

19. The conveyor of claim 18 further comprising a support plate with the fixed portion of each of the plurality of drives secured thereto in a fixed orientation with the rotatable portion rotatably carried by the fixed portion to change the orientation of the output drive about the first axis.

20. The conveyor of claim 16 wherein each of the plurality of output drives extend above the support plate to define the conveying surface.

21. The conveyor of claim 16 wherein at least a substantial portion of the fixed portion of the housing extends below the support plate with a portion of the input drives extending below the fixed portion to engage with a source of power to rotate the output drives.

22. The conveyor of claim 16 further comprising a bearing retained in a bearing support of the fixed portion of the housing to rotatably support the first bevel and the second bevel for rotation about the first axis.

23. The conveyor of claim 16 further comprising input bearings retained in the fixed portion with the input drive supported therebetween to rotate about the input axis.

24. The conveyor of claim 16 further comprising input bearings retained in the fixed portion with the input drive supported therebetween to rotate about the input.

* * * * *